United States Patent
Chen et al.

(10) Patent No.: US 8,441,459 B2
(45) Date of Patent: May 14, 2013

(54) IN-CELL CAPACITIVE TOUCH PANEL

(75) Inventors: Po-Yang Chen, Taipei (TW); Po-Sheng Shih, Taipei (TW); Kei-Hsiung Yang, Taipei (TW)

(73) Assignee: Hannstar Display Corporation, Taipei (TW)

( * ) Notice: Subject to any disclaimer, the term of this patent is extended or adjusted under 35 U.S.C. 154(b) by 879 days.

(21) Appl. No.: 12/405,910

(22) Filed: Mar. 17, 2009

(65) Prior Publication Data

US 2010/0079406 A1 Apr. 1, 2010

(30) Foreign Application Priority Data

Sep. 30, 2008 (TW) ................................ 97137574 A

(51) Int. Cl.
*G06F 3/045* (2006.01)
(52) U.S. Cl.
USPC ........................................................ 345/174
(58) Field of Classification Search ........................ None
See application file for complete search history.

(56) References Cited

U.S. PATENT DOCUMENTS

| | | | | |
|---|---|---|---|---|
| 7,280,167 | B2 * | 10/2007 | Choi et al. | 349/12 |
| 7,755,369 | B2 * | 7/2010 | Chuang et al. | 324/686 |
| 2004/0095298 | A1 * | 5/2004 | Miyazawa | 345/76 |
| 2008/0036751 | A1 * | 2/2008 | Yamazaki | 345/205 |
| 2008/0225025 | A1 * | 9/2008 | Uchino et al. | 345/204 |
| 2010/0059296 | A9 * | 3/2010 | Abileah et al. | 178/18.09 |

* cited by examiner

*Primary Examiner* — Joseph Haley
*Assistant Examiner* — Emily Frank
(74) *Attorney, Agent, or Firm* — Ming Chow; Sinorica, LLC

(57) ABSTRACT

An in-cell capacitive touch panel is disclosed. The present invention utilizes a sensing unit that comprises a sensing liquid crystal capacitor and three transistors to detect touch events. A first transistor is connected to a first gate line and the sensing liquid crystal capacitor and controlled by the first gate line to charge the sensing liquid crystal capacitor. A second transistor together with a third transistor functions as a capacitance-current converter. The second transistor generates an output current according to the voltage of a first electrode of the sensing liquid crystal capacitor. A second gate line controls the third transistor to transfer the output current through a readout line to a readout unit that determines the touch positions. Thus, the in-cell capacitive touch panel of the present invention can use a simple-structure readout circuit to achieve superior readout accuracy and is adaptive to various sizes of touch panels.

20 Claims, 10 Drawing Sheets

IN-CELL CAPACITIVE TOUCH PANEL

BACKGROUND OF THE INVENTION

1. Field of the Invention

The present invention relates to a touch panel, particularly to an in-cell capacitive touch panel.

2. Description of the Related Art

The touch panel has been more and more popular recently. When touched by a finger or a stylus, a touch panel outputs an analog signal, and a controller converts the analog signal into a digital signal recognizable by a computer. The touch panel driver program processes the digital signal and controls a display card to present the touched position on the touch panel.

The current touch panels may be categorized into the resistive type, capacitive type, sonic type, infrared type and in-cell type. Among them, the in-cell type touch panel attracts much attention. The traditional resistive type or capacitive type touch panel needs an additional touch panel for detecting touch events on the display panel. The in-cell touch panel has the touch control function built inside the LCD cell without the additional touch panel and thus has advantages of lightweight, compactness and high optical performance. Therefore, the in-cell touch panel is highly valued.

At present, most of the in-cell touch panels belong to the optical sensation type, wherein photo sensors built inside the LCD cell sense brightness variation on the touch panel to detect whether there is a touch event. Refer to FIG. 1 and FIG. 2. The photo sensor may be a TFT (Thin Film Transistor) sensor 10, such as a photo sensor consisting of a photo TFT and a Readout TFT. The photo sensor may also be a p-i-n diode 12. However, the background of the detected image varies with the situation of the touch panel, and the environmental brightness affects the detection of the photo sensor. To solve such a problem, the readout system has to possess a dynamic feedback and auto-calibration capability. Thus, the system becomes more complicated. So far, the problem still lacks an effective solution.

Refer to FIG. 3a for a conventional in-cell capacitive touch panel. The in-cell capacitive touch panel has a plurality of sensing liquid crystal capacitors (Cslc) 14. Each sensing liquid crystal capacitor 14 is cascaded to a reference capacitor (Cref) 16. The capacitance variation of the sensing liquid-crystal capacitors 14 is used to detect touch events and determine touch points. Refer to FIG. 3b for the structure of the sensing liquid-crystal capacitor 14. The sensing liquid crystal capacitor 14 has an upper transparent substrate 141, an upper metal layer 142, a liquid crystal layer 143, a lower metal layer 144, and a lower transparent substrate 145 from top to bottom. The upper metal layer 142 functions as the electrode layer and provides a common voltage source (Vcom). The in-cell capacitive touch panel is exempted from the influence of environmental illumination and has a simpler readout system than the optical sensation type in-cell touch panel. However, the in-cell capacitive touch panel also has its own problems. For example, large-size in-cell capacitive touch panels are hard to fabricate because their capacitive sensors have pretty high parasitic capacitance. Further, the capacitive sensors can only reach a common level accuracy because of the high parasitic capacitance. Therefore, a high-resolution capacitive sensor is hard to achieve.

Accordingly, the present invention proposes a novel in-cell capacitive touch panel to solve the abovementioned problems.

SUMMARY OF THE INVENTION

The primary objective of the present invention is to provide an in-cell capacitive touch panel, which uses a combination of a sensing liquid crystal capacitor and three transistors to function as a high-resolution sensing unit. The sensing unit is installed inside the LCD cell, has advantages of lightweight, small size and high optical performance and is adaptive to a large-size touch panel, whereby the present invention has a simple-structure readout unit and high readout accuracy, wherefore the present invention can effectively solve the problems of the conventional technologies.

To achieve the abovementioned objective, the present invention proposes an in-cell capacitive touch panel, which comprises a plurality of gate lines and a plurality of sensing units each connected to gate lines. Each sensing unit includes a sensing liquid crystal capacitor and three transistors. A first transistor is connected to a first gate line and the sensing liquid crystal capacitor and is controlled by the first gate line to charge the sensing liquid crystal capacitor and generate a reference voltage. A second transistor is connected to a first electrode of the sensing liquid crystal capacitor. A third transistor is connected to a second gate line and a readout line. The second transistor generates an output current to the third transistor according to the voltage of the first electrode of the sensing liquid crystal capacitor. The second gate line controls the third transistor to transfer the output current to the readout line. The readout unit receives the output current to detect touch events and find out touch positions.

Below, the embodiments are described in detail in cooperation with the attached drawings to make easily understood the objectives, technical contents, characteristics and accomplishments of the present invention.

DETAILED DESCRIPTION OF THE INVENTION

The in-cell capacitive touch panel of the present invention comprises a display unit. The display unit contains a plurality of data lines and a plurality of gate lines. The data lines and gate lines cross each other to form a pixel array. The display unit also has a plurality of sensing units arranged thereinside. Each pixel of the display unit has a pixel TFT (Thin Film Transistor), a pixel electrode, a pixel capacitor, and a storage capacitor. Each sensing unit is electrically coupled to a readout line and at least one gate line of the display unit and further comprises a sensing liquid crystal capacitor and three TFTs for detecting touch events. The number of the sensing units is determined by the required resolution of the touch panel. The number of the sensing units may be equal or unequal to the number of the pixels. When the number of the sensing units is equal to the number of the pixels, the sensing units are preferably one-by-one corresponding to the pixels. Below, one embodiment of a single sensing unit is used to demonstrate the technical features of the present invention, and the detailed structure of the pixel is omitted for simplicity.

Figure 1:
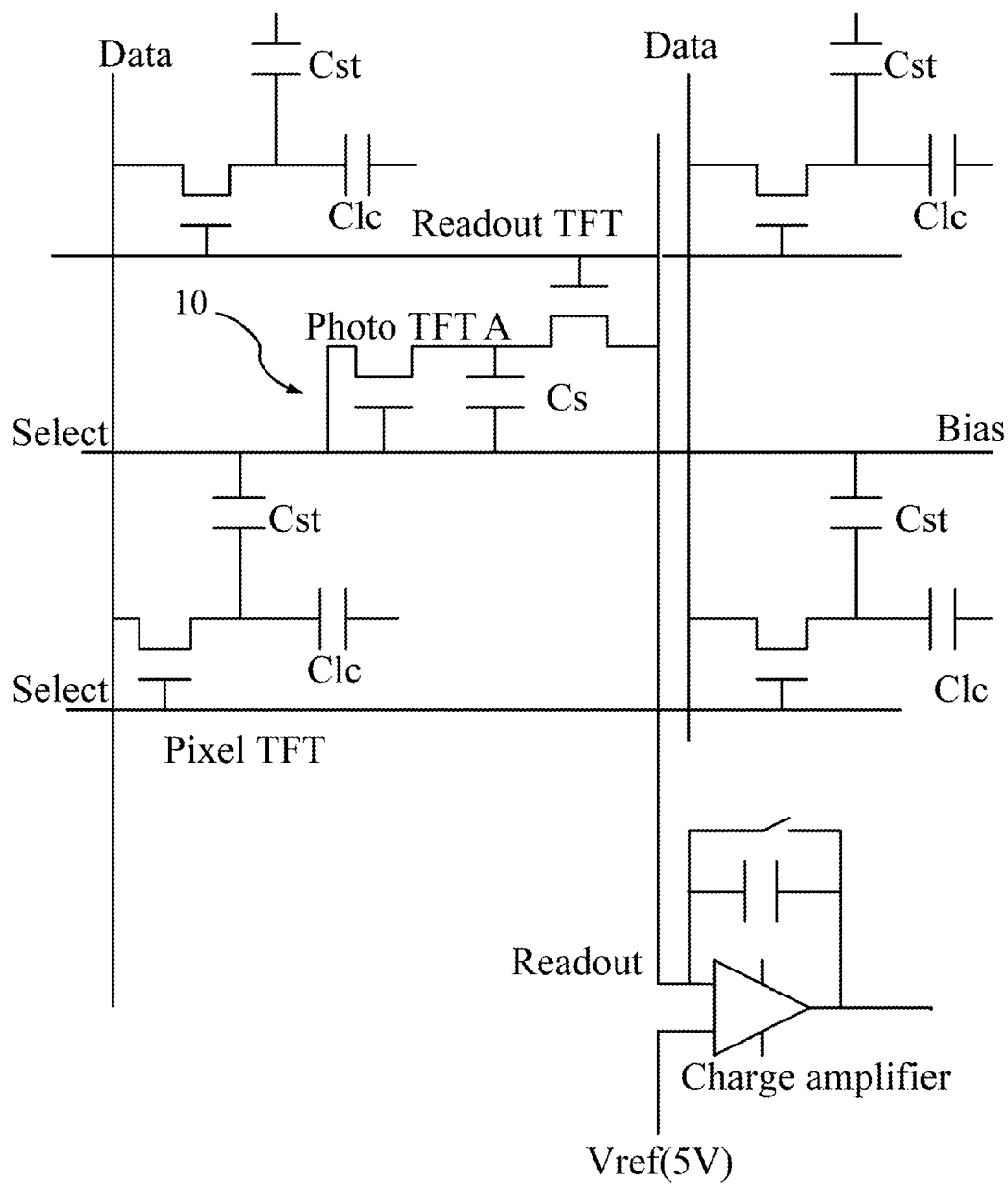
FIG. 1 is a diagram schematically showing a conventional TFT sensor circuit.
Figure 2:
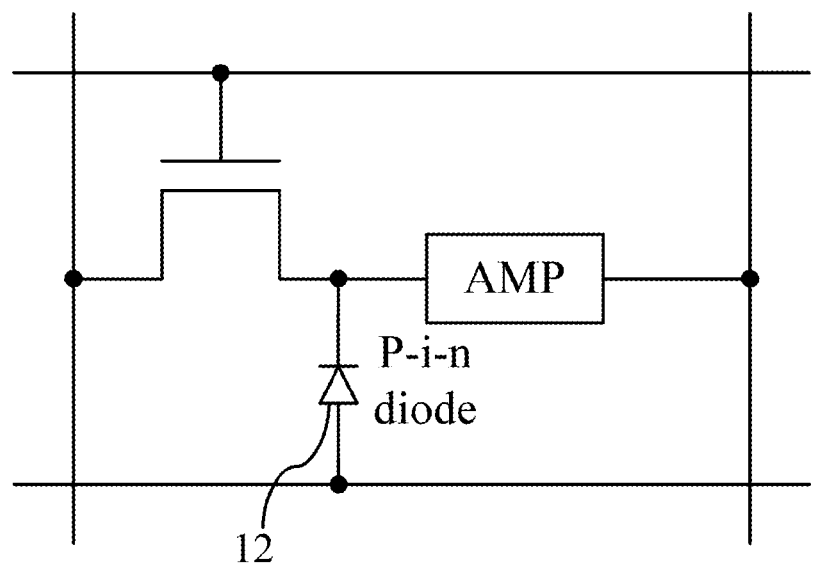
FIG. 2 is a diagram schematically showing a conventional p-i-n diode sensor circuit.
Figure 3B:
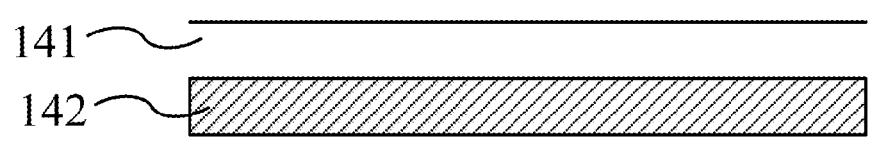
FIG. 3b is a diagram schematically showing the structure of a conventional sensing liquid crystal capacitor.
Figure 3B:
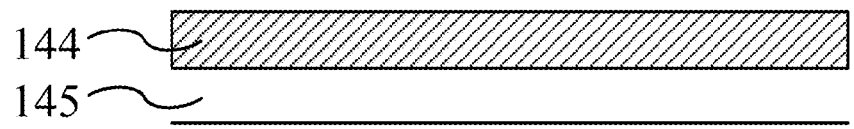
Figure 3A:
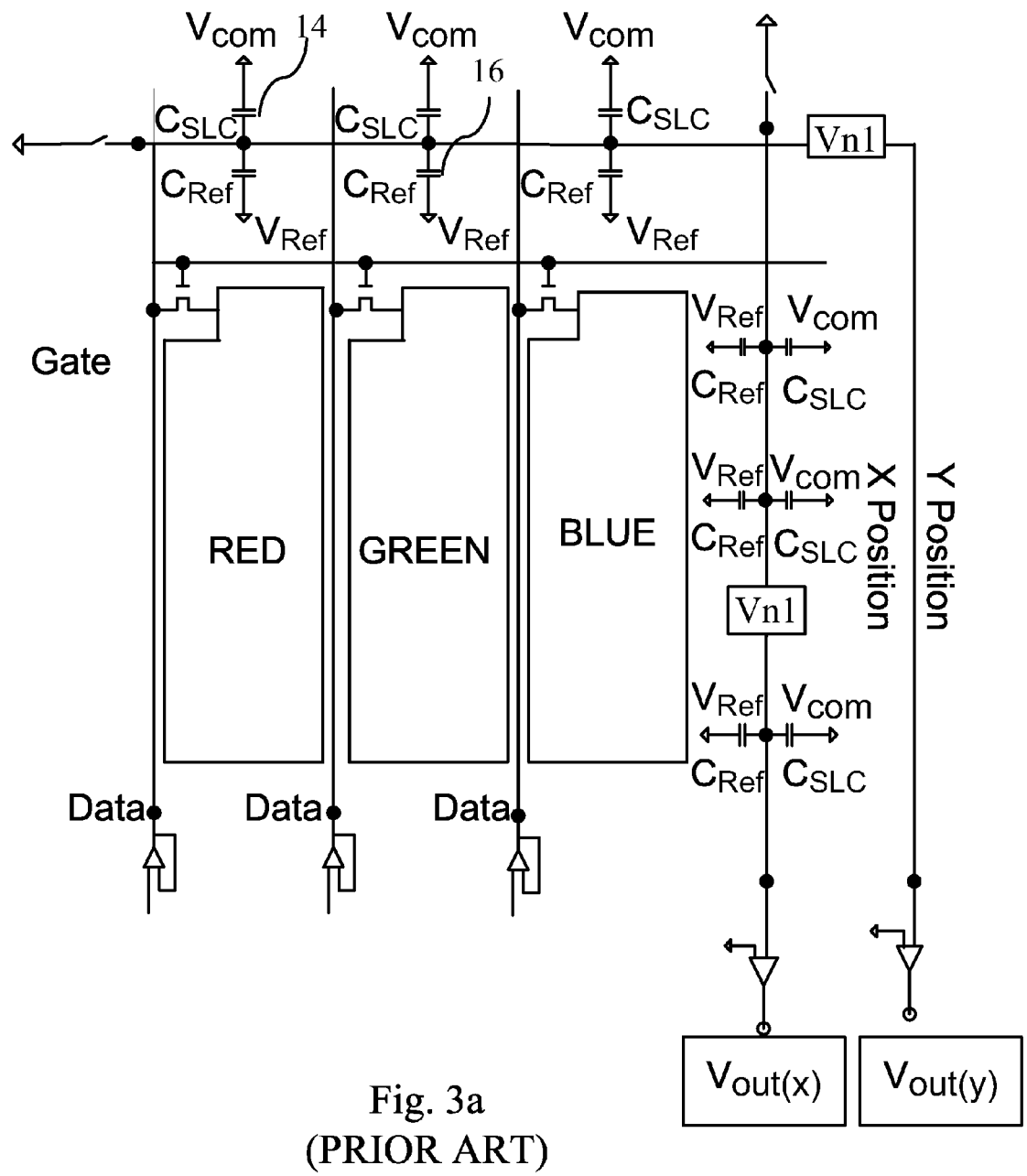
FIG. 3a is a diagram schematically showing a capacitive sensing circuit of a conventional in-cell touch panel.
Figure 4:
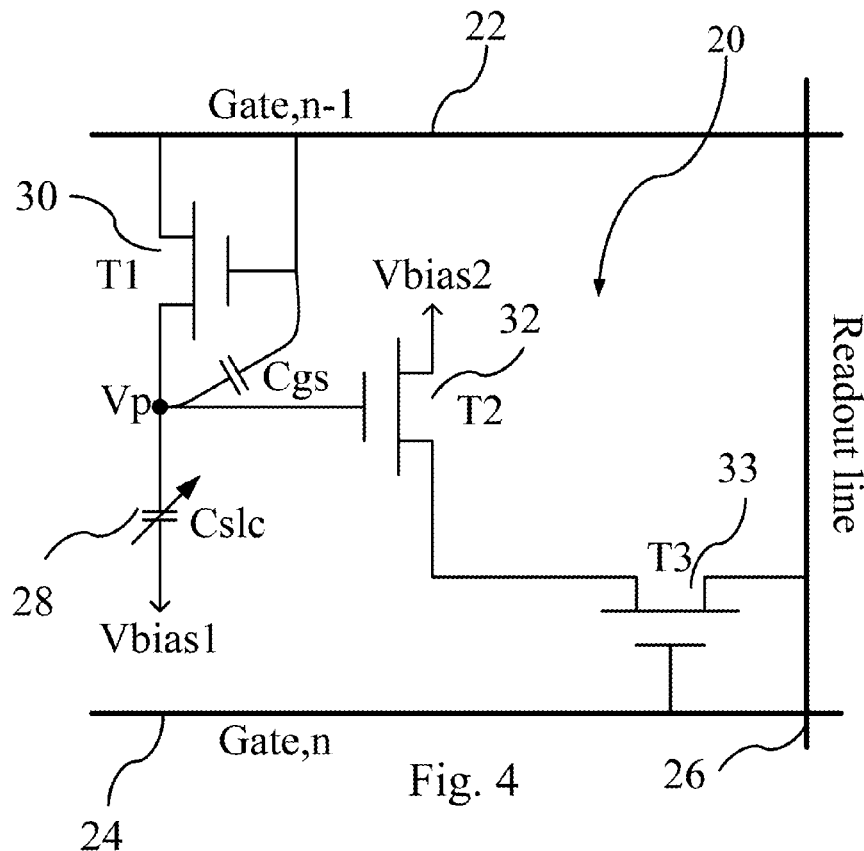
FIG. 4 is a diagram schematically showing a single sensing unit according to the present invention.

Refer to FIG. 4. Each sensing unit 20 is arranged between two adjacent gate lines (the (n−1)th gate line and the nth gate line). In FIG. 4, the sensing unit 20 is arranged between a first gate line 22 and a second gate line 24 and electrically coupled to the first gate line 22 and the second gate line 24. Each sensing unit 20 includes a sensing liquid crystal capacitor (Cslc) 28 and three TFTs—a first transistor (T1) 30, a second transistor (T2) 32 and a third transistor (T3) 33. The gate and drain of the first transistor 30 are connected to the first gate line 22, and the source of the first transistor 30 is connected to a first electrode of the sensing liquid crystal capacitor 28. The first gate line 22 controls the first transistor 30 to charge the sensing liquid crystal capacitor 28 and generate a reference voltage (Vp) at a node P. The voltage level of the first electrode of the sensing liquid crystal capacitor 28 is equal to the voltage level of the node P. A second electrode of the sensing liquid crystal capacitor 28 is connected to a first bias source Vbias1. The gate of the second transistor 32 is connected to the first electrode of the sensing liquid-crystal capacitor 28 and the source of the first transistor 30. The drain and source of the second transistor 32 are respectively connected to the drain of the third transistor 33 and a second bias source Vbias2. The gate and source of the third transistor 33 are respectively connected to the second gate line 24 and a readout line 26. The second transistor 32 and the third transistor 33 control the conduction state of the second transistor 32 according to the variation of the reference voltage Vp (i.e. the voltage variation of the first electrode of the sensing liquid crystal capacitor 28). The second bias source Vbias2 generates an output current to the third transistor 33 and then to the readout line 26. A touch on the touch panel varies the capacitance of the sensing liquid crystal capacitor 28 and the reference voltage Vp, which further makes the second transistor 32 generates an output current 21 to the third transistor 33. Thus, the second gate line 24 controls the third transistor 33 to transfer the output current 21 to the readout line 26 and then to a readout unit (not shown in the drawings). The readout unit determines the touch position according to the variation of the output current 21. The first bias source Vbias1 and the second bias source Vbias2 may be connected to an identical voltage source or different voltage sources, preferably to a common voltage source Vcom of the display unit.

Figure 5:
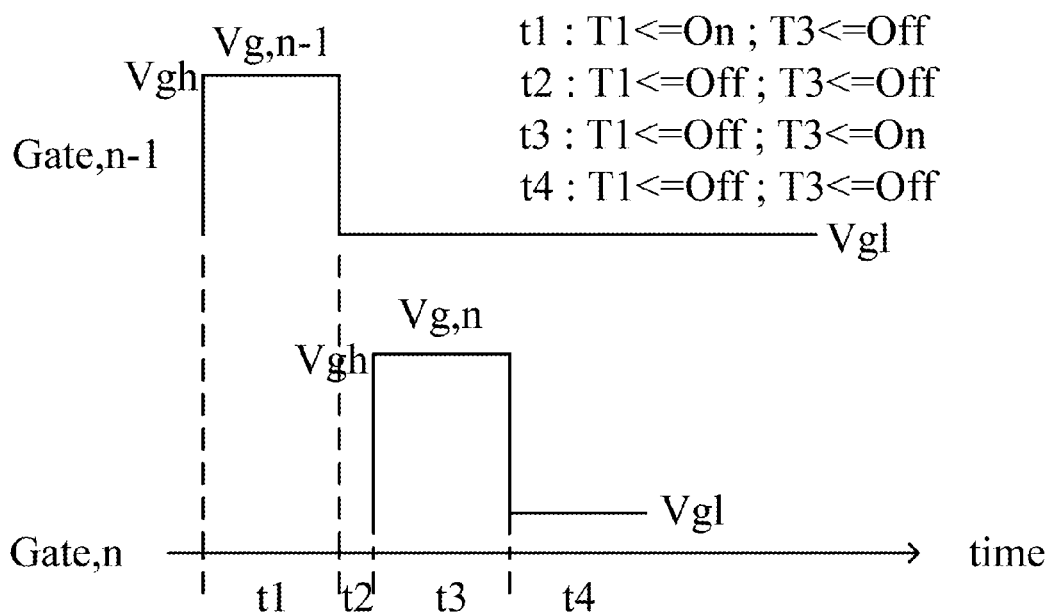
FIG. 5 is a diagram showing the relationship of timing and operations of a sensing unit according to the present invention.

Refer to FIG. 5 for the relationship of the timing and the operations of the sensing unit. An operation cycle of the sensing unit 20 includes four stages of t1, t2, t3 and t4, wherein the signals of the gate lines 22 and 24 respectively vary the states of the three transistors 30, 32 and 33:

In stage t1, the first transistor 30 is turned on, and the third transistor 33 is turned off.

In stage t2, the first transistor 30 is turned off, and the third transistor 33 is turned off.

In stage t3, the first transistor 30 is turned off, and the third transistor 33 is turned on.

In stage t4, the first transistor 30 is turned off, and the third transistor 33 is turned off.

Below are described the details of each stage.

Figure 6A:
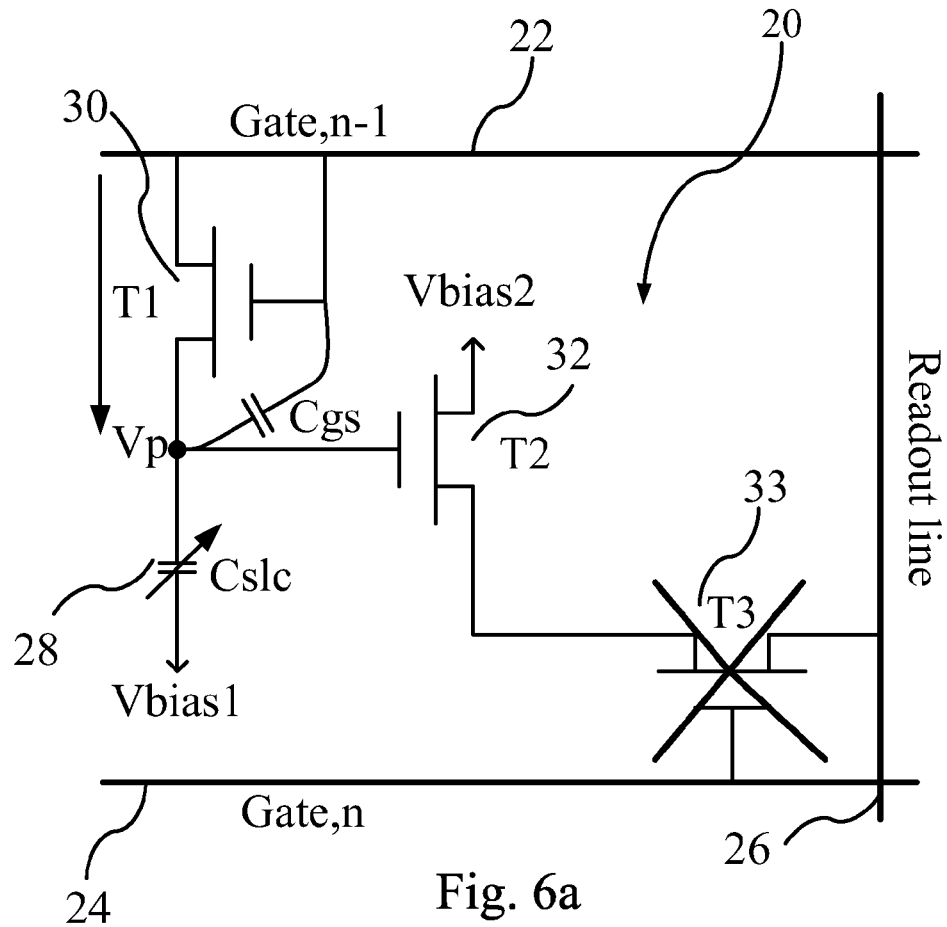
FIG. 6a and FIG. 6b are diagrams respectively showing the circuit of a sensing unit and the waveform of the gate signal in stage t1 of the sensing unit according to the present invention.
Figure 6B:
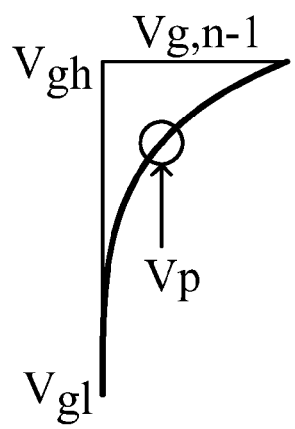

Refer to FIG. 6a and FIG. 6b. In stage t1, the first gate line 22 (n−1) and the second gate line (n) 24 respectively have a high voltage level Vgh and a low voltage level Vgl, which turns on the first transistor 30 and turns off the third transistor 33. At this moment, the high voltage level Vgh of the first gate line 22 (n−1) charges the sensing liquid crystal capacitor 28 via the first transistor 30 to generate a reference voltage Vp at the node P.

Figure 7A:
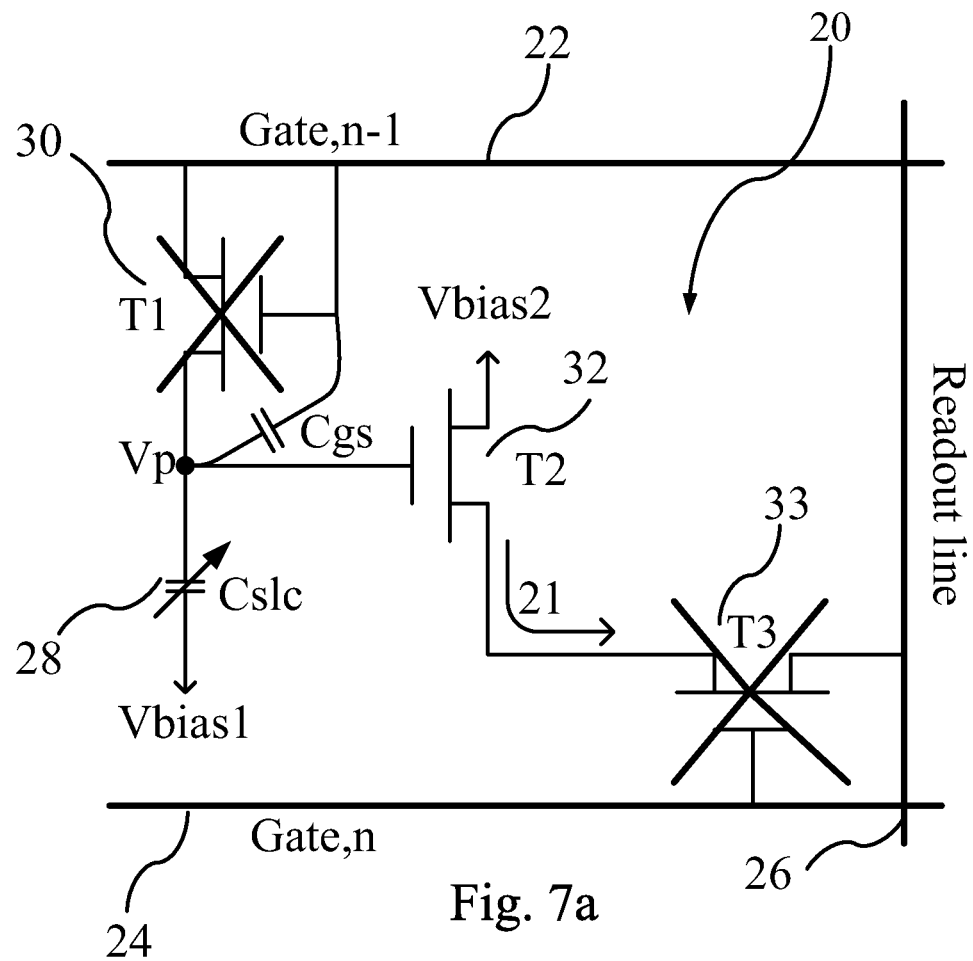
FIG. 7a and FIG. 7b are diagrams respectively showing the circuit of a sensing unit and the waveform of the gate signal in stage t2 of the sensing unit according to the present invention.
Figure 7B:
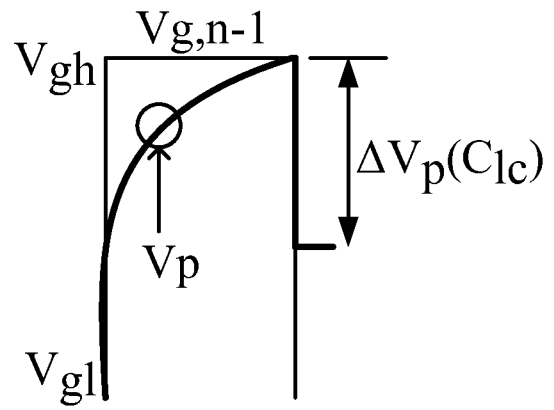

Refer to FIG. 7a and FIG. 7b. In stage t2, the voltage of the first gate line 22 (n−1) rapidly descends from the high voltage level Vgh to the low voltage level Vgl (as shown in FIG. 7b), and the voltage of the second gate line (n) 24 still maintains at the low voltage level Vgl. Because of the coupling effect, the first electrode of the sensing liquid crystal capacitor 28 has a voltage variation, which controls the second transistor 32 to generate an output current to the third transistor 33. The voltage variation $\Delta V_p$ of the reference voltage Vp can be expressed by Equation (1):

$$\Delta V_p = \frac{C_{gs}}{C_{gs} + C_{slc}} \cdot \Delta V_g \qquad (1)$$

wherein Cslc is the capacitance of the sensing liquid crystal capacitor 28, and Cgs is the gate-source capacitance of the first transistor 30. When there is a touch events (such as a user touches the sensing unit), the capacitance Cslc of the sensing liquid crystal capacitor 28 varies. From Equation (1), it is known that Vp varies also. Thus, the conduction state of the second transistor 32 varies also, which further varies the output current 21 flowing to the third transistor 33.

Figure 8A:
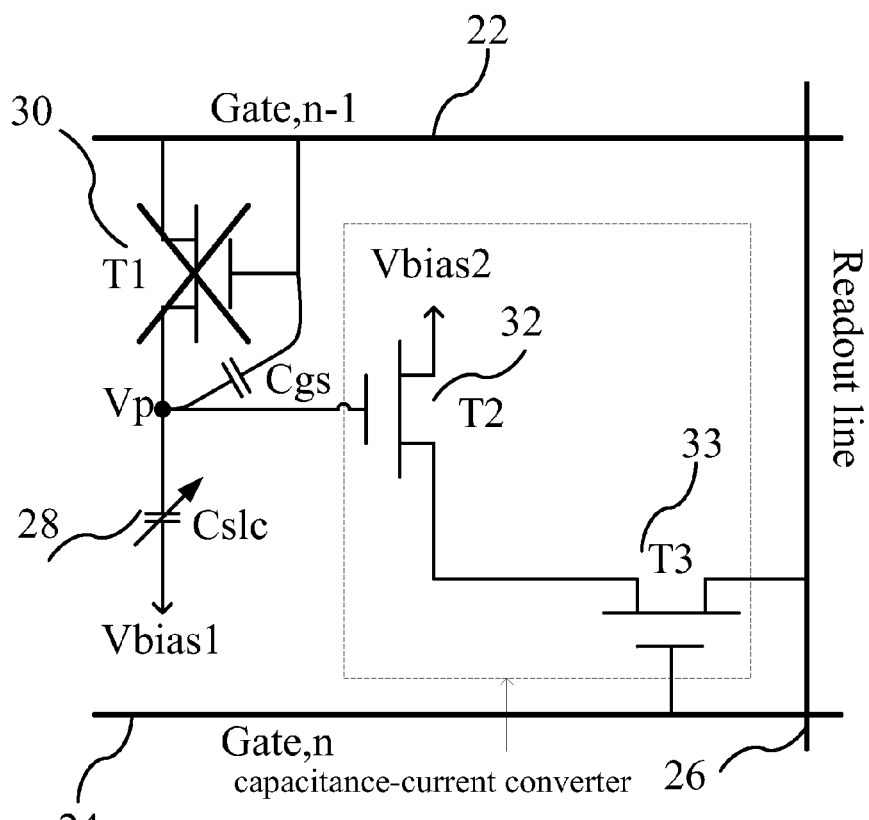
FIG. 8a and FIG. 8b are diagrams respectively showing the circuit of a sensing unit and the waveform of the gate signal in stage t3 of the sensing unit according to the present invention.
Figure 8B:
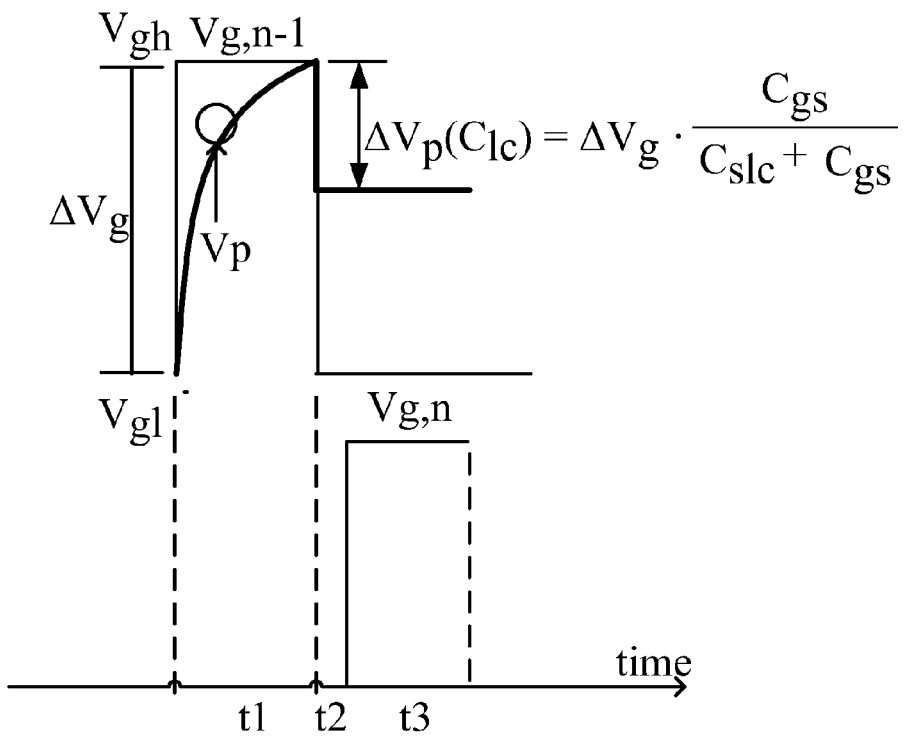

Refer to FIG. 8a and FIG. 8b. In stage t3, the voltage of the second gate line (n) 24 increases to the high voltage level Vgh, which turns on the third transistor 33. At this moment, both the second transistor 32 and the third transistor 33 turn on, and the third transistor 33 controls the output current 21 to flow to the readout line 26, and the readout unit determines the touch position. From the above description, it is known that the combination of the second transistor 32 and the third transistor 33 can be regarded as a capacitance-current converter, which transforms the variation of the reference voltage Vp into the variation of an output current. The variation of the output current is then transferred to the readout line 26 via the third transistor 33.

Figure 9A:
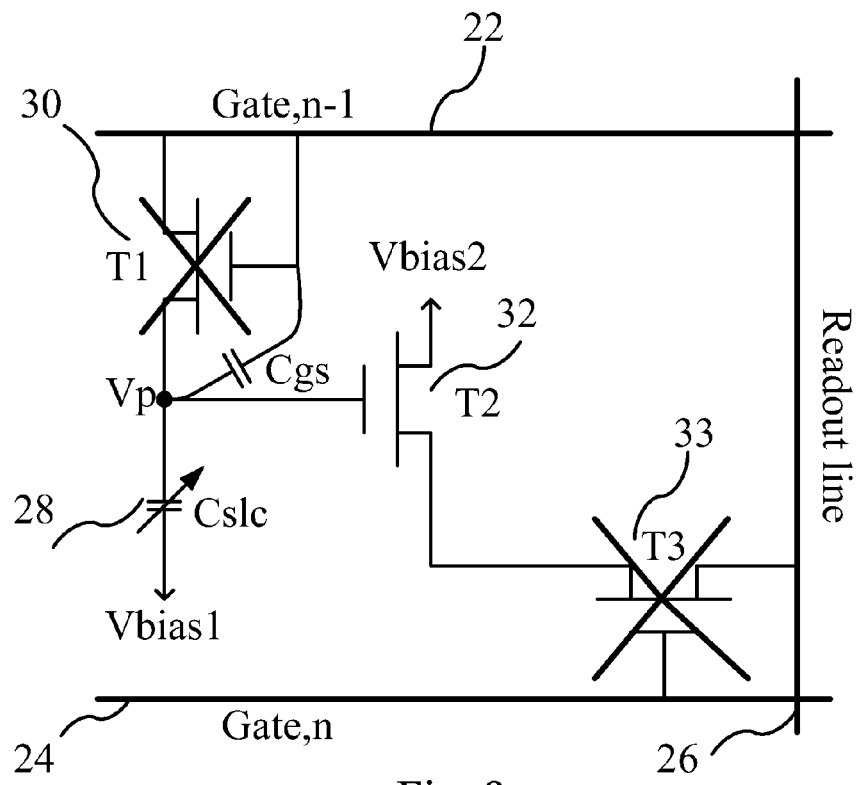
FIG. 9a and FIG. 9b are diagrams respectively showing the circuit of a sensing unit and the waveform of the gate signal in stage t4 of the sensing unit according to the present invention.
Figure 9B:
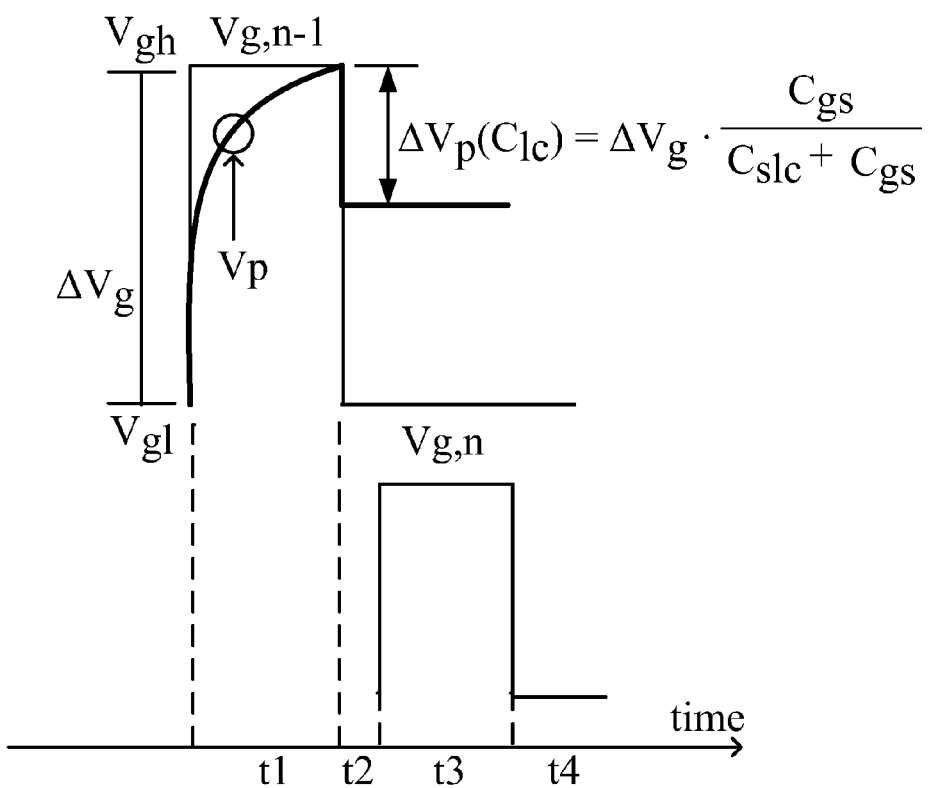

Refer to FIG. 9a and FIG. 9b. In stage t4, the voltages of the first gate line 22 (n−1) and the second gate line (n) 24 both descend to the low voltage level Vgl. At this moment, both the first transistor 30 and the third transistor 33 turn off until next sampling time.

Figure 10:
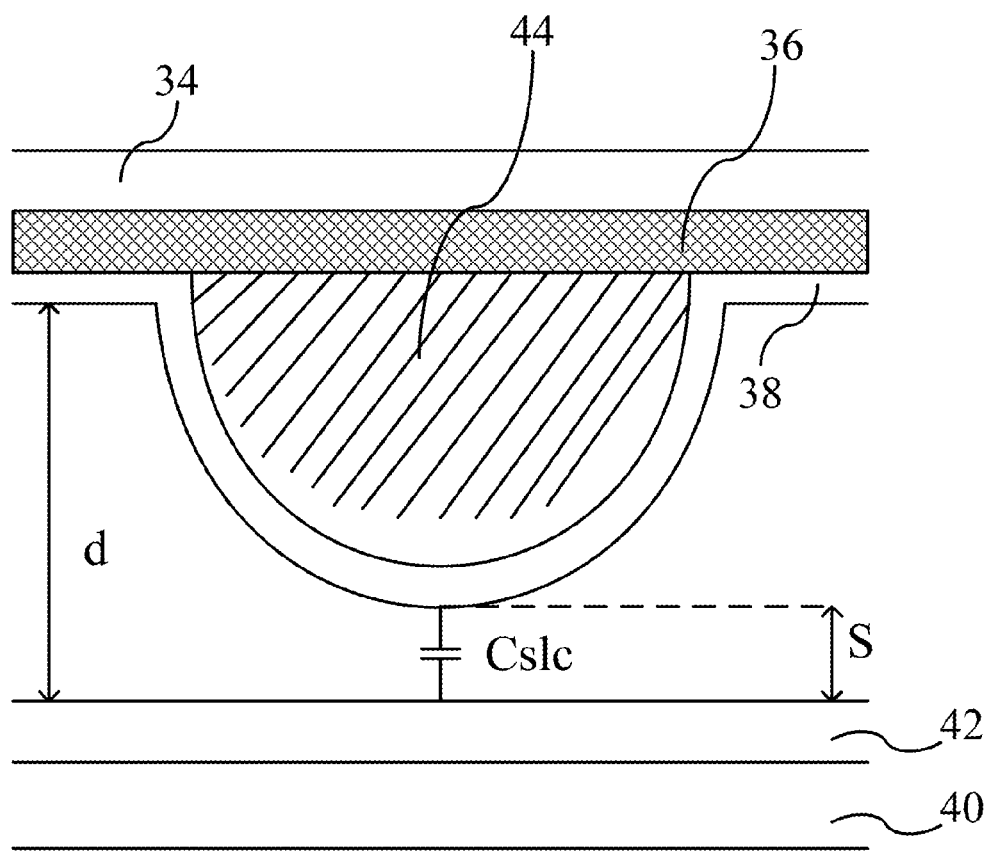
FIG. 10 is a diagram schematically showing the structure of a sensing liquid crystal capacitor having a protrusion on the transparent substrate corresponding to the sensing liquid crystal capacitor according to the present invention.
Figure 11:
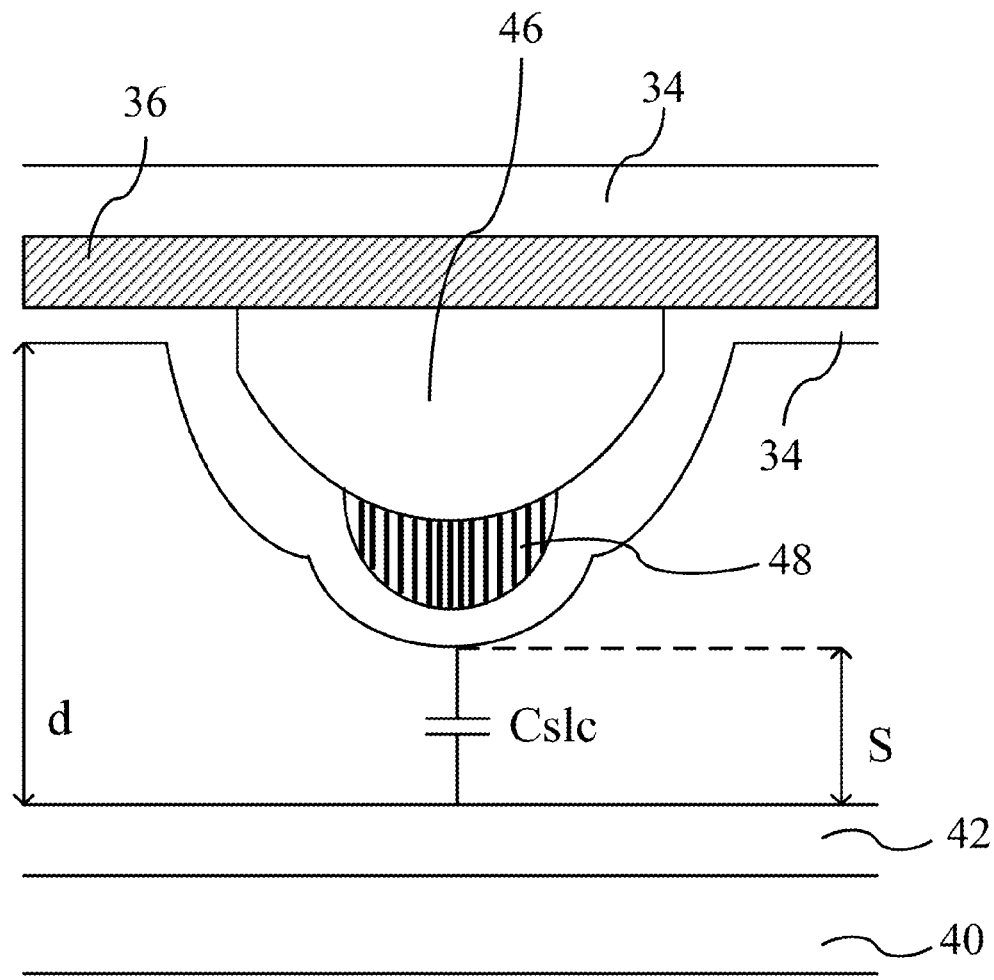
FIG. 11 is a diagram schematically showing the structure of a sensing liquid crystal capacitor having color resistors stacked on the color filter corresponding to the sensing liquid crystal capacitor according to the present invention.

To optimize the present invention and achieve a higher sensing accuracy, the gate-source capacitance Cgs of the first transistor 30 is designed to be slightly greater than or about equal to the capacitance Cslc of the sensing liquid crystal capacitor 28 in the array design according to Equation (1). Further, the cell gap in the sensing liquid crystal capacitor 28 is decreased to increase the ratio of the cell gap variation to the cell gap in the cell design. Refer to FIG. 10. In one embodiment of the present invention, the sensing liquid crystal capacitor 28 comprises a first transparent substrate 34, a color filter 36 on the first transparent substrate 34, a conductive electrode layer 38 on the color filter 36, a second transparent substrate 40, and a conductive electrode layer 42 on the second transparent substrate 40. The second transparent substrate 40 is formed of TFT substrates. A protrusion 44 is formed in between the color filter 36 and the conductive electrode layer 38 corresponding to each sensing liquid crystal capacitor. Thus, the cell gap in the sensing liquid crystal capacitor (Cslc) 28 is decreased from d to S. Alternatively, color resists are stacked on the color filter 36 of each sensing liquid crystal capacitor. For example, a first color resist 46 and a second color resist 48 are stacked on the color filter 36, as shown in FIG. 11. Thus, the cell gap in the sensing liquid crystal capacitor (Cslc) is decreased from d to S. For example, the cell gap in the sensing liquid crystal capacitor is reduced to less than 1.5 μm. The smaller the cell gap, the more sensitive the sensing liquid crystal capacitor. Therefore, the sensing unit is more likely to detect the touch events.

In the present invention, the capacitive sensing units are installed inside the LCD cell and have advantages of lightweight, small size and high optical performance. The technology of the present invention applies to large-size touch panels and has superior readout accuracy and simpler readout circuit structure. Therefore, the present invention can effectively solve the conventional problems. Further, the protrusion design of the present invention can further promote the accuracy of detecting touch events.

The embodiments described above are to demonstrate the technical contents and characteristics of the present invention to enable the persons skilled in the art to understand, make, and use the present invention. However, it is not intended to limit the scope of the present invention. Therefore, any equivalent modification or variation according to the spirit of the present invention is to be also included within the scope of the present invention.

What is claimed is:

1. An in-cell capacitive touch panel comprising:
a first gate line;
a second gate line; and
a sensing unit comprising:
at least one sensing liquid crystal capacitor;
a first transistor,
being controlled by said first gate line to charge said sensing liquid crystal capacitor and to generate a reference voltage at a first electrode of said sensing liquid crystal capacitor, and comprising
a drain being connected to said first gate line;
a source being connected to said sensing liquid crystal capacitor; and
a gate being connected to said first gate line and said sensing liquid crystal capacitor, wherein said reference voltage is adjusted based on a voltage of said first gate line and a voltage variation $\Delta V_p$ of said reference voltage is expressed by an equation:

$$\Delta V_p = \frac{C_{gs}}{C_{gs} + C_{slc}} \cdot \Delta V_g,$$

wherein $\Delta V_g$ is a voltage drop of said voltage of said first gate line, $\Delta V_p$ is said voltage variation of said reference voltage, $C_{gs}$ is a gate-source capacitance of said first transistor and $C_{slc}$ is a capacitance of said sensing liquid crystal capacitor;
a second transistor being driven by said reference voltage and generating an output current based on the received said reference voltage, wherein a gate of said second transistor is connected to said first electrode of said sensing liquid crystal capacitor and receives said reference voltage; and
a third transistor being coupled to said second transistor and connected to said second gate line and a readout line, being controlled by said second gate line, and transferring said output current to said readout line.

2. The in-cell capacitive touch panel according to claim 1, wherein said first transistor, said second transistor and third transistor are thin film transistors (TFTs).

3. The in-cell capacitive touch panel according to claim 1 further comprising a readout unit, which is connected to said readout line and receives said output current to detect touch events and find out touch positions.

4. The in-cell capacitive touch panel according to claim 1, wherein said gate and said drain of said first transistor are connected to said first gate line; said source of said first transistor is connected to said first electrode of said sensing liquid crystal capacitor and said gate of said second transistor.

5. The in-cell capacitive touch panel according to claim 4, wherein a second electrode of said sensing liquid crystal capacitor is connected to a first bias source; a source of said second transistor is connected to a second bias source.

6. The in-cell capacitive touch panel according to claim 5, wherein said first bias source and said second bias source are connected to a common voltage source.

7. The in-cell capacitive touch panel according to claim 1, wherein said gate of said second transistor is connected to said first electrode of said sensing liquid crystal capacitor and said source of said first transistor; a drain of said second transistor is connected to a drain of said third transistor.

8. The in-cell capacitive touch panel according to claim 7, wherein a second electrode of said sensing liquid crystal capacitor is connected to a first bias source; a source of said second transistor is connected to a second bias source.

9. The in-cell capacitive touch panel according to claim 8, wherein said first bias source and said second bias source are connected to a common voltage source.

10. The in-cell capacitive touch panel according to claim 1, wherein a gate of said third transistor is connected to said second gate line; a drain of said third transistor is connected to a drain of said second transistor; a source of said third transistor is connected to said readout line.

11. The in-cell capacitive touch panel according to claim 1, wherein said sensing unit comprises following stages:
in stage one, letting said first gate line and said second gate line respectively have said high voltage level and said low voltage level to turn on said first transistor and turn off said third transistor; via said first transistor charging said sensing liquid crystal capacitor;
in stage two, letting voltage of said first gate line rapidly descend from said high voltage level to said low voltage level and maintaining voltage of said second gate line at said low voltage level to generate said voltage variation of said first electrode of said sensing liquid crystal capacitor to switch said second transistor and generate said output current to said third transistor;
in stage three, letting voltage of said second gate line increase to said high voltage level to turn on said third transistor and control said output current to flow to said readout line; and
in stage four, letting voltages of said first gate line and said second gate line both descend to said low voltage level to turn off said first transistor and said third transistor.

12. The in-cell capacitive touch panel according to claim 1, wherein said sensing liquid crystal capacitor further comprises two transparent substrates, two electrode layers respectively arranged on said two transparent substrates, and a liquid crystal layer arranged in between said two electrode layers.

13. The in-cell capacitive touch panel according to claim 12, wherein a protrusion is formed on said transparent substrate corresponding to said sensing liquid crystal capacitor to make a liquid crystal cell within a range of said protrusion has a smaller cell gap than a liquid crystal cell outside said range of said protrusion.

14. The in-cell capacitive touch panel according to claim 1, wherein a protrusion is formed on a color filter corresponding to said sensing liquid crystal capacitor to make a liquid crystal cell within a range of said protrusion has a smaller cell gap than a liquid crystal cell outside said range of said protrusion.

15. The in-cell capacitive touch panel according to claim 14, wherein said protrusion is formed via stacking at least two color resists.

16. The in-cell capacitive touch panel according to claim 1, wherein said gate-source capacitance of said first transistor is greater than or equal to said capacitance of said sensing liquid crystal capacitor.

17. An in-cell capacitive touch panel comprising:
a first gate line and a second gate line; and
a sensing unit further comprising:
  a sensing liquid crystal capacitor;
  a first transistor, wherein a gate and a drain of said first transistor are connected to said first gate line, and a source of said first transistor is connected to a first electrode of said sensing liquid crystal capacitor;
  a second transistor, wherein a gate of said second transistor is connected to said source of said first transistor and said first electrode of said sensing liquid crystal capacitor; and
  a third transistor, wherein a gate, a drain and a source of said third transistor are respectively connected to said second gate line, a drain of said second transistor and a readout line, wherein a drain of said first transistor is connected to said first gate line; a source of said first transistor is connected to said sensing liquid crystal capacitor; a gate of said first transistor is connected to both said first gate line and said sensing liquid crystal capacitor; said first transistor is controlled by said first gate line to charge said sensing liquid crystal capacitor and generate a reference voltage at the first electrode of said sensing liquid crystal capacitor; when a voltage of said first gate line rapidly descends from a high voltage level to a low voltage level, generating a voltage drop $\Delta V_g$, a voltage variation $\Delta V_p$ of said reference voltage is expressed by an equation:

$$\Delta V_p = \frac{C_{gs}}{C_{gs} + C_{slc}} \cdot \Delta V_g$$

wherein $C_{gs}$ is a gate-source capacitance of said first transistor and $C_{slc}$ is a capacitance of said sensing liquid crystal capacitor;
said second transistor is driven by said reference voltage and generates an output current to said third transistor according to said reference voltage; and
said third transistor is controlled by said second gate line to transfer said output current to said readout line.

18. The in-cell capacitive touch panel according to claim 17, wherein a second electrode of said sensing liquid crystal capacitor is connected a first bias source, and a source of said second transistor is connected to a second bias source.

19. The in-cell capacitive touch panel according to claim 18, wherein said first bias source is connected to a common voltage source.

20. The in-cell capacitive touch panel according to claim 18, wherein said first bias source and said second bias source are connected to a common voltage source.

* * * * *